(No Model.)

J. B. SECOR.
CLUTCH FOR SEWING MACHINE WHEELS.

No. 301,012. Patented June 24, 1884.

Attest:
Com? A. Cooper
H. E. Hansmann.

Inventor:
J. B. Secor,
by Foster & Freeman
Attys

UNITED STATES PATENT OFFICE.

JEROME B. SECOR, OF BRIDGEPORT, CONNECTICUT.

CLUTCH FOR SEWING-MACHINE WHEELS.

SPECIFICATION forming part of Letters Patent No. 301,012, dated June 24, 1884.

Application filed August 22, 1883. (No model.)

*To all whom it may concern:*

Be it known that I, JEROME B. SECOR, of Bridgeport, Fairfield county, State of Connecticut, have invented certain new and useful Improvements in Clutches for Sewing-Machine Wheels, of which the following is a specification.

My invention is a device whereby the wheel of a sewing-machine may be connected to or disconnected from the shaft, so as to either turn with or upon the latter at the will of the operator, the said device being constructed as fully described hereinafter, so that the wheel may be fixed or released by a single movement without any parts being exposed and liable to injury.

Figure 1:
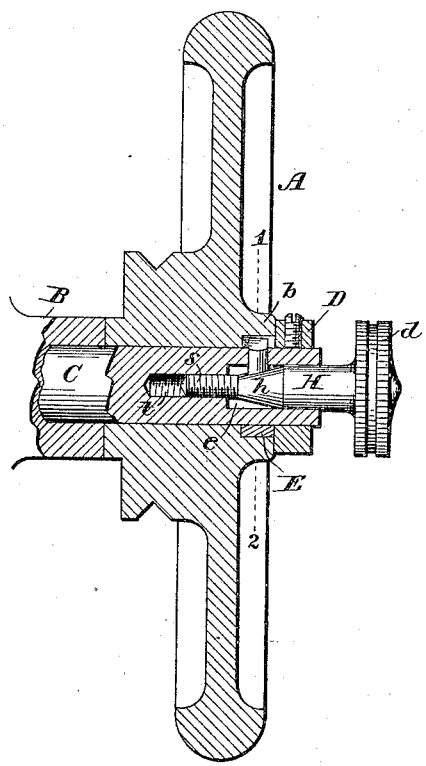
Figure 2:
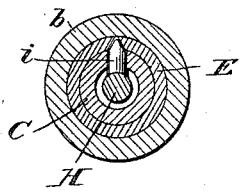

In the drawings, Figure 1 is a vertical section showing the rear end of a sewing-machine shaft, the wheel, and clutch device. Fig. 2 is a section on the line 1 2, Fig. 1.

The wheel A turns with or on the end of the shaft C between a hub of the sewing-machine frame B and a collar, D, secured to the shaft.

In a recess in the hub $b$ of the wheel A, and surrounding the shaft C, fits loosely a split ring, E, having beveled ends, between which projects the wedge end of a pin, $i$, that slides in a radial hole in the shaft C.

In a longitudinal hole, $e$, in the end of the shaft fits a pin, H, having a milled head, $d$, and a screw end, $s$, between which and the cylindrical body is a tapering portion, $h$. The screw end $s$ fits a threaded recess, $t$, in the shaft, and the pin $i$ bears on the tapering portion of the pin H, so that as the latter is carried inward the pin $i$ will be forced outward, and its beveled end will separate the ends of the ring E, and, by expanding the latter, create such a frictional contact with the wheel A as will carry the shaft with the latter. On withdrawing the pin H the pin $i$ falls inward, the ring contracts, and the wheel turns without turning the shaft. The inward and outward motions of the pin H are effected by simply turning the pin.

It is obvious that the cylindrical portion of the pin H may be threaded and fit a threaded portion of the opening $t$, instead of having the threaded ends, and that the tapering portion $h$ may be arranged so as to throw out the pin $i$ by an outward motion of the pin H.

It will further be apparent that other appliances—as a rotating pin with an eccentric portion—may be substituted for the pin H for throwing in and out the pin $i$. The ring-recess may also be in the shaft instead of in the wheel.

I claim—

The combination, with the shaft C of a sewing-machine, having a threaded longitudinal end opening, and with the wheel A, confined to turn on the shaft without sliding, of a split ring, E, arranged between the shaft and wheel, a wedge-ended pin, $i$, extending through a radial opening in the shaft and between the ends of the ring, and a screw-pin, H, having a tapering portion, $h$, all substantially as set forth.

In testimony whereof I have signed my name to this specification in the presence of two subscribing witnesses.

JEROME B. SECOR.

Witnesses:
ADORNO A. WHITMAN,
ALFRED B. BEERS.